United States Patent
Nakayama

(10) Patent No.: US 10,411,526 B2
(45) Date of Patent: Sep. 10, 2019

(54) STATOR FOR ROTATING ELECTRICAL MACHINE AND ROTATING ELECTRICAL MACHINE

(71) Applicant: Hitachi Automotive Systems, Ltd., Hitachinaka-shi, Ibaraki (JP)

(72) Inventor: Kenichi Nakayama, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/381,649

(22) Filed: Apr. 11, 2019

(65) Prior Publication Data
US 2019/0238008 A1     Aug. 1, 2019

Related U.S. Application Data

(63) Continuation of application No. 15/210,351, filed on Jul. 14, 2016, now Pat. No. 10,305,335.

(51) Int. Cl.
| | | |
|---|---|---|
| *H02K 3/30* | (2006.01) | |
| *H02K 1/04* | (2006.01) | |
| *H02K 3/38* | (2006.01) | |

(52) U.S. Cl.
CPC ............... *H02K 1/04* (2013.01); *H02K 3/30* (2013.01); *H02K 3/38* (2013.01)

(58) Field of Classification Search
CPC ................................. H02K 3/30; H02K 1/04
See application file for complete search history.

(56) References Cited

U.S. PATENT DOCUMENTS

| | | | |
|---|---|---|---|
| 8,030,812 B2 | 10/2011 | Tanaka | |
| 8,446,061 B2 | 5/2013 | Nakayama | |
| 9,929,612 B2 | 3/2018 | Fukuda | |
| 2011/0181143 A1* | 7/2011 | Hasegawa | H02K 3/38 310/180 |
| 2011/0227443 A1 | 9/2011 | Kamatani | |
| 2013/0300246 A1* | 11/2013 | Kaimori | H02K 3/32 310/201 |
| 2014/0333171 A1* | 11/2014 | Lange | H02K 3/18 310/208 |
| 2015/0022045 A1* | 1/2015 | Hagiwara | H02K 3/38 310/201 |

FOREIGN PATENT DOCUMENTS

| | | |
|---|---|---|
| JP | 2008-283824 A | 11/2008 |
| JP | 2011-151975 A | 8/2011 |
| JP | 2014-64384 A | 4/2014 |

OTHER PUBLICATIONS

International Search Report (PCT/ISA/210) issued in PCT Application No. PCT/IB2017/052327 dated Jul. 18, 2017 (2 pages).
Written Opinion (PCT/ISA/237) issued in PCT Application No. PCT/IB2017/052327 dated Jul. 18, 2017 (6 pages).

\* cited by examiner

*Primary Examiner* — Naishadh N Desai
(74) *Attorney, Agent, or Firm* — Crowell & Moring LLP

(57) ABSTRACT

A component for a rotating electrical machine includes a stator, a winding, and a covering material. The stator has a stator core with a plurality of slots. The winding is inserted into one slot. The covering material covers the winding. The winding has a molten metal junction. The covering material has a non-bending part and a bending part. The bending part has a contact area that is smaller than an area between the non-bending part and the winding. The bending part is provided between the molten metal junction and the portion of the winding inserted in the one slot.

4 Claims, 13 Drawing Sheets

INNER CIRCUMFERENTIAL SIDE

OUTER PERIPHERAL SIDE

STATOR FOR ROTATING ELECTRICAL MACHINE AND ROTATING ELECTRICAL MACHINE

CROSS REFERENCE

This application is a continuation of co-pending application Ser. No. 15/210,351, filed Jul. 14, 2016 designating the United States of America. The entire disclosures of which are herein expressly incorporated by reference.

BACKGROUND OF THE INVENTION

Field of the Invention

The present invention relates to a component (e.g., a stator) for a rotating electrical machine and a rotating electrical machine, and more particularly, to a rotating electrical machine to generate a torque for automobile traveling, or to generate electric power upon braking.

Description of the Related Art

In a rotating electrical machine, a rotating magnetic field is generated by supplying alternating current (AC) power to a stator winding, then a rotor is rotated with the rotating magnetic field. Further, the mechanical energy applied to the rotor may be converted to electrical energy, to output the AC power from a coil. In this manner, the rotating electrical machine operates as an electric motor or a generator.

As a stator for this type of rotating electrical machine, a structure formed by weld-connecting segment coil terminals is known (e.g., Japanese Patent Application Laid-Open No. 2011-151975). When this type of rotating electrical machine is mounted in an automobile, it is attached in a narrow limited space. Accordingly, downsizing is required. It is necessary to realize low coil end in accordance with downsizing. Therefore it is necessary to reduce the height of the end coil and ensure an insulating distance within the narrow limited space. The problem is how to ensure a stable insulating distance in the segment coil.

SUMMARY OF THE INVENTION

The object of the present invention is to improve insulating reliability of a stator for a rotating electrical machine and the rotating electrical machine.

A stator for a rotating electrical machine according to the present invention including: a winding having a molten metal junction; and a covering material that covers the winding, wherein the covering material has a bending part that bends to be in partially contact with the winding.

The rotating electrical machine according to the present invention including: a stator having a stator core with a plurality of slots arrayed in a circumferential direction and a stator coil with an insulting film inserted in the slot; and a rotor rotatably provided with a predetermined gap with respect to the stator core, wherein in the stator coil, a plurality of segment coils having an approximate U-shaped conductor are connected, and the plurality of segment coils include a first segment coil and a second segment coil connected to the first segment coil via a weld, and wherein in the first segment coil or the second segment coil, a bellows with a coil width of the first segment coil or a coil width of the second segment coil is formed in enamel coat on the axial direction side of the weld.

According to one aspect of the present invention, it is possible to improve insulating reliability of a stator for a rotating electrical machine and the rotating electrical machine.

DESCRIPTION OF THE PREFERRED EMBODIMENTS

Hereinbelow, an embodiment of the present invention will be described with reference to the drawings.

A rotating electrical machine according to the present embodiment is a rotating electrical machine preferably available for automobile traveling. Note that so-called electric vehicles using a rotating electrical machine include a hybrid type electric vehicle (HEV) provided with both of an engine and the rotating electrical machine and a pure electric vehicle (EV) which travels only with the rotating electrical machine without engine. The rotating electrical machine described below is available for the both types of vehicles. Here a rotating electrical machine used in the hybrid type electric vehicle on behalf of the both types of vehicles will be described.

Further, in the following description, an "axial direction" means a direction along a rotary shaft of the rotating electrical machine. A "circumferential direction" means a direction along a rotational direction of the rotating electrical machine. A "radial direction" means a radial direction upon rotation about the rotary shaft of the rotating electrical machine as a center. An "inner circumferential side" means the inner side in the radial direction (inner diameter side) and an "outer peripheral side", an opposite direction, i.e., the outer side in the radial direction (outer diameter side).

(Schematic Configuration of Vehicle)

Figure 14:
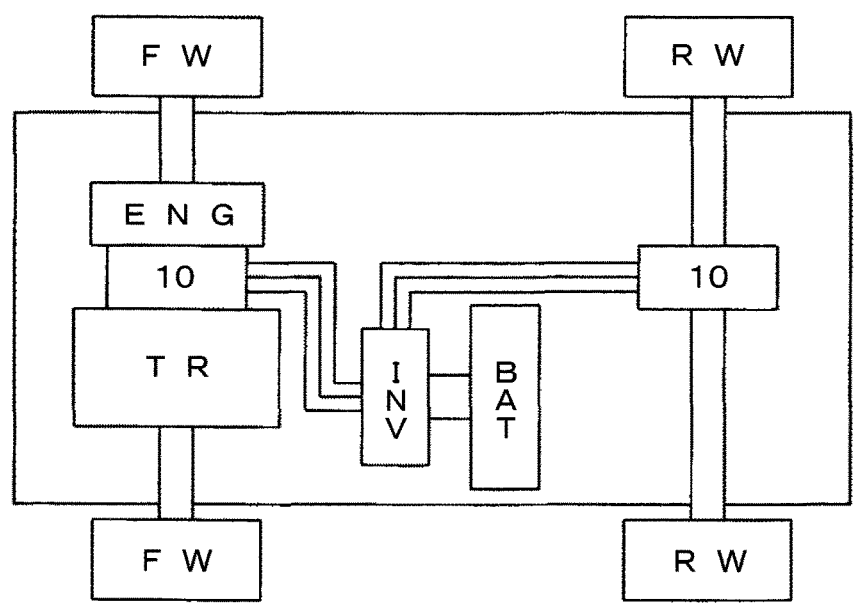
FIG. 14 is a block diagram showing a configuration of a vehicle in which the rotating electrical machine 10 according to the embodiment is mounted.

First, a schematic configuration of a vehicle in which the rotating electrical machine is mounted will be described with reference to FIG. 14. FIG. 14 is a block diagram showing a schematic configuration of a power train of a four-wheel drive hybrid vehicle. The vehicle is provided with, as a main power on the front wheel side, an engine ENG and a rotating electrical machine 10. The motive power generated with the engine ENG and the rotating electrical machine 10 is subjected to transmission with a transmission TR, and the motive power is transmitted to a front wheel side drive wheel FW. Further, in rear wheel driving, the rotating electrical machine 10 provided on the rear wheel side and a rear wheel side drive wheel RW are mechanically connected to each other, and the motive power is transmitted. The rotating electrical machine 10 as a power source of the front wheel side is provided between the engine ENG and the transmission TR.

The rotating electrical machine 10 performs engine start, and selects generation of driving force, or generation of power-generating capacity to collect energy upon vehicle deceleration as electrical energy, in correspondence with vehicle traveling status. The driving and power generating operation of the rotating electrical machine 10 are controlled with a power conversion device INV so as to optimize torque and the number of revolutions in accordance with vehicle driving status. The electric power necessary for driving of the rotating electrical machine 10 is supplied from a battery BAT via the power conversion device INV. Further, when the rotating electrical machine 10 performs power-generating operation, the battery BAT is charged with electrical energy via the power conversion device INV.

The rotating electrical machine 10 is a permanent magnet built-in type three-phase synchronous motor. The rotating electrical machine 10 operates as an electric motor to rotate a rotor when a stator coil is supplied with three-phase alternating current. Further, when the rotating electrical machine 10 is driven with the engine, it operates as a generator, and outputs three-phase alternating current as generated electric power. That is, the rotating electrical machine 10 has a function as an electric motor to generate a rotation torque based on electrical energy and a function as a generator to perform power generation based on mechanical energy. It is possible to selectively use the functions in accordance with vehicle traveling status.

(Rotating Electrical Machine 10)

Figure 1:
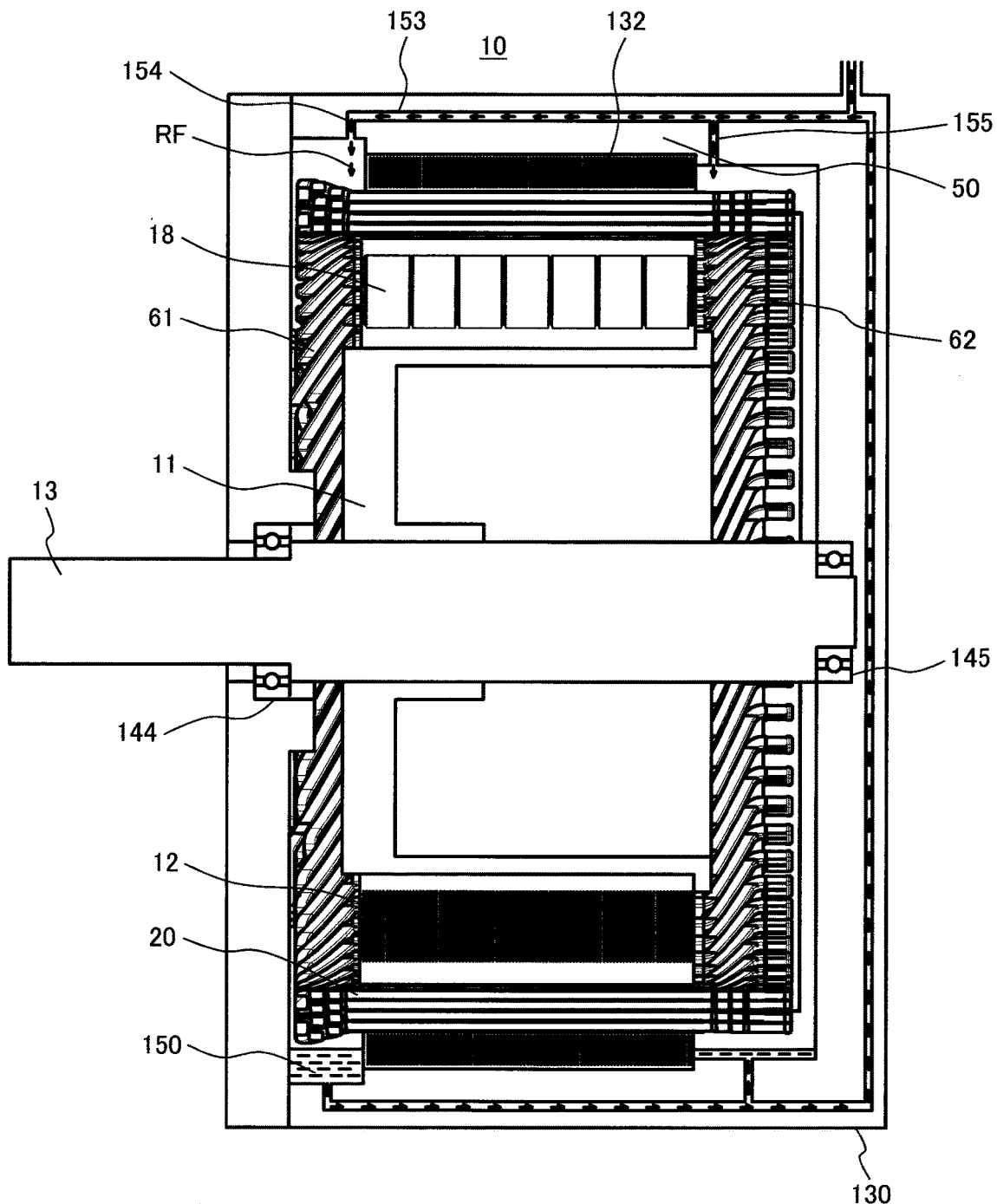
FIG. 1 is a cross-sectional diagram of a rotating electrical machine 10 according to an embodiment of the present invention.
Figure 2:
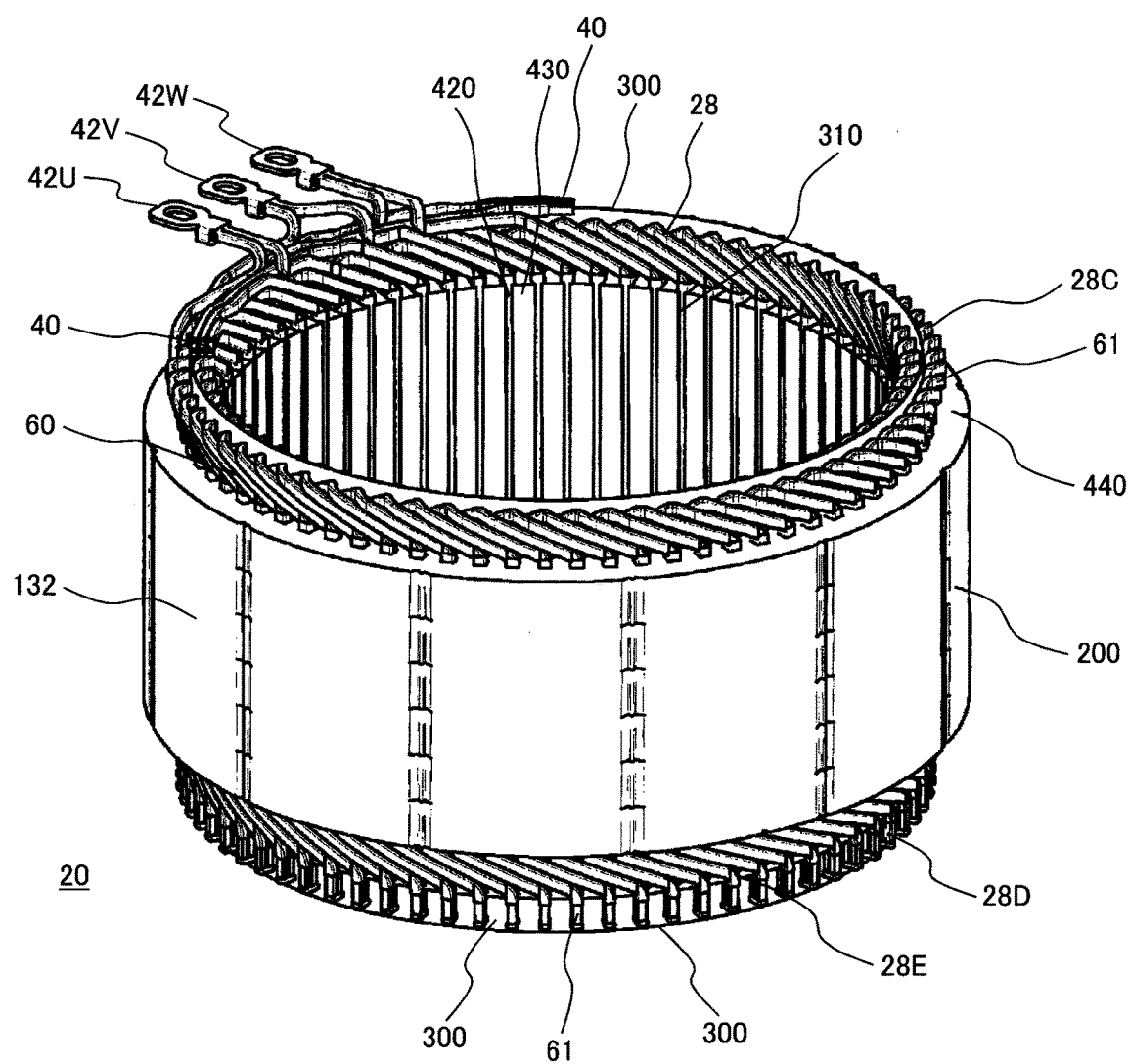
FIG. 2 is a perspective diagram of a stator 20.
Figure 3:
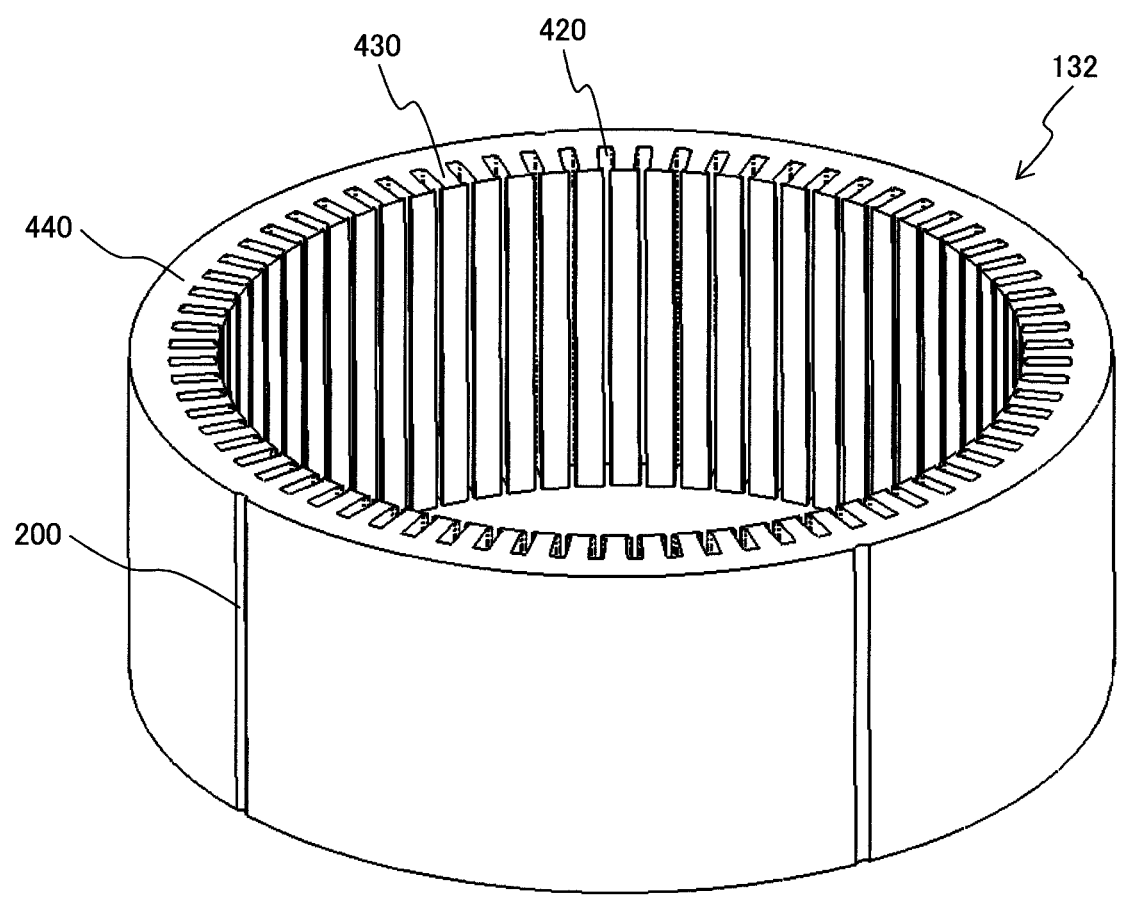
FIG. 3 is a perspective diagram of a stator core 132.

FIG. 1 is a cross-sectional diagram of the rotating electrical machine 10 according to the present embodiment. FIG. 2 is a perspective diagram of a stator 20. FIG. 3 is a perspective diagram of a stator core 132. The rotating electrical machine 10 is provided inside a liquid cooling jacket 130. The liquid cooling jacket 130 is configured with an engine case and a transmission case. The rotating electrical machine 10 has the stator 20, a housing 50 to hold the stator 20 and a rotor 11.

The liquid cooling jacket 130 is fixed to the outer peripheral side of the housing 50. A refrigerant passage 153 through which a liquid refrigerant RF such as oil flows is formed with the inner circumferential wall of the liquid cooling jacket 130 and the outer peripheral wall of the housing 50. A shaft 13 rotatably supported with bearings 144 and 145 provided in the liquid cooling jacket 130. Accordingly, the liquid cooling jacket 130 also functions as a bearing bracket.

Note that in the case of direct liquid cooling, as the refrigerant RF, liquid gathered in a refrigerant (oil) storage space 150 flows through the refrigerant passage 153, and flows from refrigerant passages 154 and 155 toward the stator 20, to cool the stator 20.

The stator 20 is fixed to the inner circumferential side of the housing 50. The rotor 11 is rotatably supported on the inner circumferential side of the stator 20. The housing 50 is formed in a cylindrical shape by cutting of iron material such as carbon steel, or by casting of cast steel or aluminum alloy, or by press processing, as a casing of the rotating electrical machine 10. The housing 50 is also referred to as a frame body or a frame.

The housing 50 is formed in a cylindrical shape by drawing of steel plate having a thickness of about 2 to 5 mm (high tension steel plate or the like). The housing 50 is provided with plural flanges (unshown) attached to the liquid cooling jacket 130. The plural flanges are projected outward in the radial direction at the peripheral edge of an end surface of the cylindrical housing 50. Note that the flange is formed by cutting other part than the flange part at an end formed upon drawing, integrally with the housing 50. Note that it may be configured such that the housing 50 is not provided but the stator 20 is directly fixed to the liquid cooling jacket 130 as a case.

As shown in FIG. 2, the stator 20 has a stator core 132 and a stator coil 60. The stator core 132 shown in FIG. 3 is formed by laminating silicon steel thin sheets in the axial direction. The stator coil 60 is wound around a large number of slots 420 provided in an inner circumferential part of the stator core 132. Heat generation from the stator coil 60 is transmitted via the stator core 132 to the liquid cooling jacket 130, and is radiated with the refrigerant RF flowing through the liquid cooling jacket 130.

Figure 4:
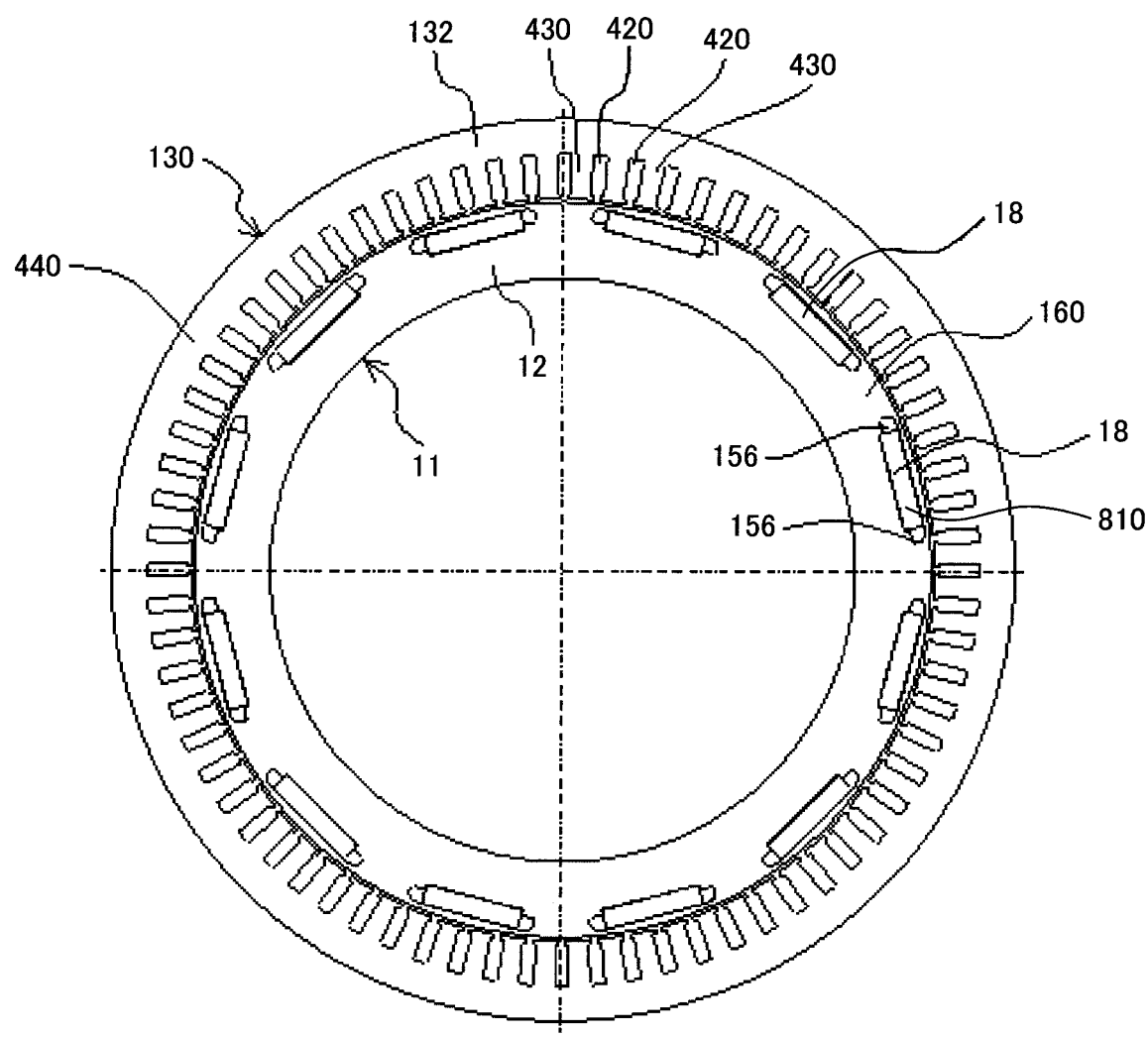
FIG. 4 illustrates a cross section of a rotor 11 and the stator core 132.

As shown in FIG. 1, the rotor 11 has a rotor core 12 and a shaft 13. FIG. 4 illustrates the cross-section of the rotor 11 and the stator core 132. Note that in FIG. 4, the shaft 13 is omitted. The rotor core 12 is formed by laminating silicon steel thin sheets in the axial direction. As shown in FIG. 1, the shaft 13 is rotatably held with the bearings 144 and 145 attached to the liquid cooling jacket 130, and rotates in a position opposite to the stator 20 in a predetermined position in the stator 20. Further, although omitted in FIG. 4, the rotor 11 is provided with an end ring.

As shown in FIG. 4, in the stator core 132, the plural slots 420 parallel to the axial direction of the stator core 132 are formed at equal intervals in the circumferential direction. The number of slots 420 is e.g. 72 in the present embodiment. The above-described stator coil 60 is accommodated in the slots 420. As shown in FIG. 3, the inner circumferential side of the respective slots 420 are opened, and the width of the opening in the circumferential direction is approximately equal to a coil attachment part of the respective slots 420 to which the stator coil 60 is attached or slightly smaller than the coil attachment part.

As shown in FIG. 3 and FIG. 4, teeth 430 are formed between the slots 420. The respective teeth 430 are integrated with a ring-shape core back 440. That is, the stator core 132 is an integral type core where the respective teeth 430 and the core back 440 are integrally formed. The teeth 430 guide rotating magnetic field generated with the stator coil 60 to the rotor 11, and cause the rotor 11 to cause a rotation torque.

The stator core 132 is formed by punching magnetic steel sheets having a thickness of about 0.05 to 1.0 mm and laminating the formed ring-shaped magnetic steel sheets. As shown in FIG. 3, the weld 200 is provided in parallel to the axial direction of the stator core 132 at an outer peripheral part of the ring-shaped stator core 132, by TIG welding or laser welding. Note that it may be configured such that the weld 200 is not provided but the stator core is fixed by caulking, and the stator core 132 is directly inserted and fixed in a case.

As shown in FIG. 4, a magnet insertion hole 810 in which a rectangular magnet is inserted is formed at equal intervals in the rotor core 12. A permanent magnet 18 is inserted in the respective magnet insertion holes 810 and is fixed with adhesive, powder resin, or mold. The width of the magnet insertion hole 810 in the circumferential direction is set to be greater than that of the permanent magnet 18 in the circumferential direction. A magnetic gap 156 is formed on the both sides of the permanent magnet 18. The magnetic gap 156 may be filled with adhesive or integrally fixed with the permanent magnet 18 by resin molding. The permanent magnet 18 forms a field pole of the rotor 11.

The magnetization direction of the permanent magnet 18 is toward the radial direction, and the magnetization direction is reversed by field pole. That is, assuming that in one permanent magnet 18 forming a magnetic pole, the stator side surface is magnetized to N-pole while the axis side surface, to S-pole, in the adjacent permanent magnet 18 forming the adjacent magnetic pole, the stator side surface is magnetized to S-pole while the axis side surface, to N-pole. These permanent magnets 18, magnetized such that the magnetization direction changes alternately by magnet pole, are provided in the circumferential direction. In the present embodiment, twelve permanent magnets 18 are provided at equal intervals, and twelve magnetic poles are formed in the rotor 11.

Note that as the permanent magnet 18, a neodymium or samarium sintered magnet, a ferrite magnet, a neodymium bond magnet or the like may be used. In the present embodiment, an auxiliary magnetic pole 160 is formed between the respective permanent magnets 18 forming the magnetic poles. The auxiliary magnetic pole 160 acts so as to reduce the magnetic resistance of a q-axis magnetic flux which the stator coil 60 generates. With the auxiliary magnetic pole 160, as the magnetic resistance of the q-axis magnetic flux is very small in comparison with that of a d-axis magnetic flux, large reluctance torque occurs.

Figure 5:
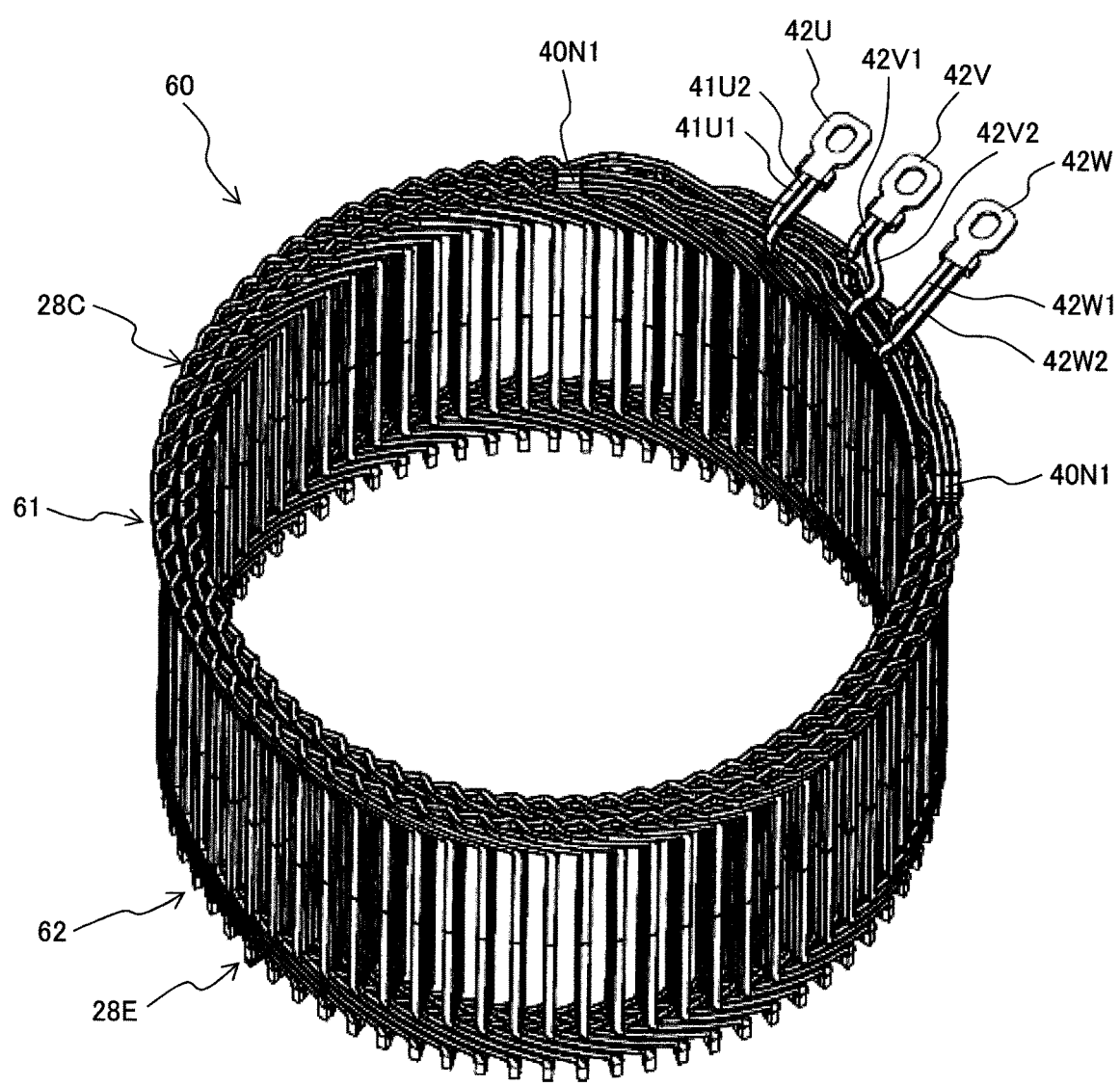
FIG. 5 is a perspective diagram of a stator coil 60.
Figure 6:
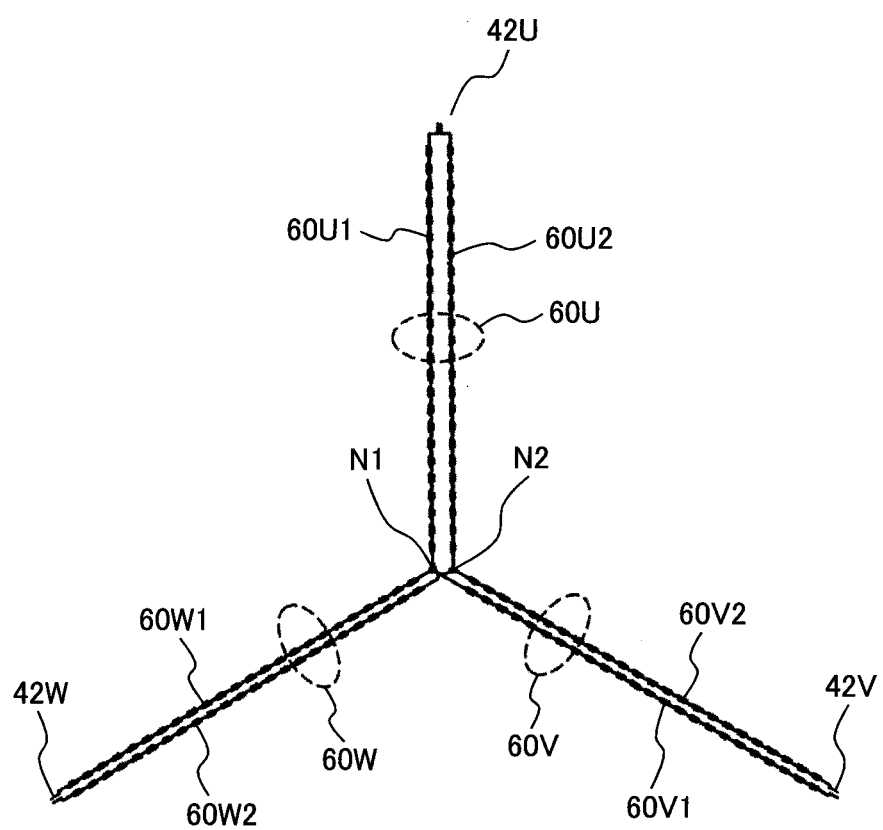
FIG. 6 illustrates star connection as an aspect of connection of the stator coil 60.

FIG. 5 is a perspective diagram of the stator coil 60. FIG. 6 illustrates star connection as an aspect of connection of the stator coil 60. In the present embodiment, a stator coil having a 2-star structure where two star connections are connected in parallel, as shown in FIG. 6, is employed as the stator coil 60. That is, the stator coil 60 has a star connection including a U1-phase coil 60U1, a V1-phase coil 60V1, and a W1-phase coil 60W1, and a star connection including a U2-phase coil 60U2, a V2-phase coil 60V2, and a W2-phase coil 60W2. Reference numerals N1 and N2 denote neutral points of the respective star connections.

The stator coil 60 may have a round or rectangular cross section. Note that since there is a tendency that a structure utilizing the internal cross section of the slot 420 as much as possible to reduce space in the slot improves efficiency, it is desirable to use the rectangular cross section. Note that regarding the length of respective sides of the rectangular cross section, the sides in the radial direction of the stator core 132 may be longer, or the sides in the circumferential direction may be longer.

In the stator coil 60 according to the present embodiment, a flat wire having a rectangular cross section is used. The longer sides of the rectangular cross section are arrayed in the circumferential direction of the stator core 132 in the slot 420. The shorter sides are arrayed in the radial direction of the stator core 132. The flat wire is coated with an insulating film on the outer periphery. As the stator coil 60, oxygen-free copper or oxygen-containing copper is used. For example, in the case of oxygen-containing copper, the oxygen content is about 10 ppm to 1000 ppm.

Figure 7A:
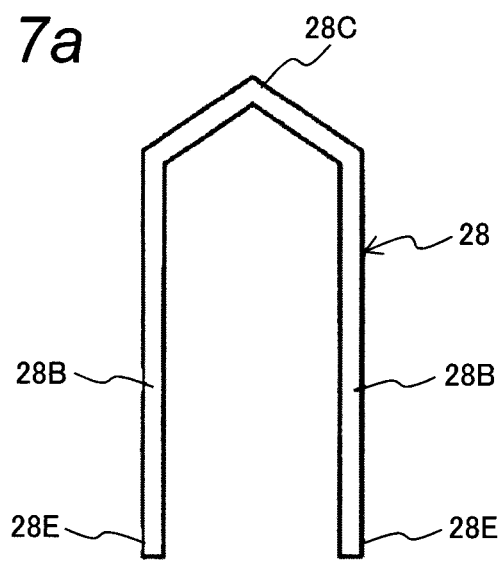
FIG. 7A is an explanatory diagram of a segment conductor 28.
Figure 7B:
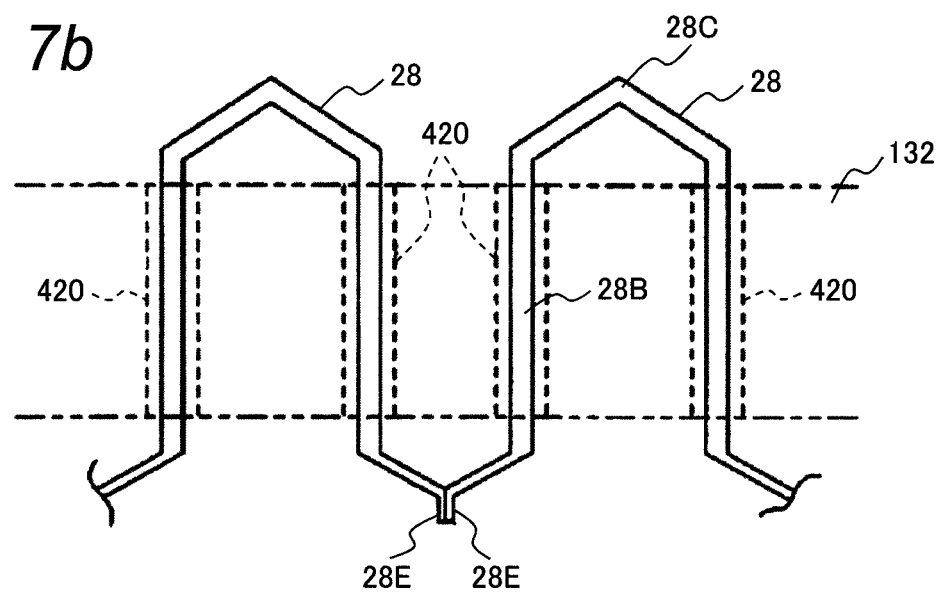
FIG. 7B is an explanatory diagram of the segment conductor 28 inserted in the stator core 132.

FIG. 7A is an explanatory diagram of a segment conductor 28. FIG. 7B is an explanatory diagram of the segment conductor 28 inserted in the stator core 132. The U1-phase coil 60U1, the V1-phase coil 60V1, the W1-phase coil 60W1, the U2-phase coil 60U2, the V2-phase coil 60V2 and the W2-phase coil 60W2 are wave winding coils formed by connecting plural segment conductors 28 as shown in FIG. 7A. FIG. 7A shows a shape of the segment conductor 28 before it is attached to the stator core 132. The segment conductor 28 is formed with a flat wire, in an approximate U-shape having a pair of legs 28B and a head end 28C connecting them.

When the respective phase coils are formed by connecting the segment conductors 28, as shown in FIG. 7B, the pair of legs 28B of the segment conductor 28 are respectively inserted into different slots 420 from one side of the stator core 132 in the axial direction. Thereafter, the legs 28B sticking out to the other side of the stator core 132 in the axial direction are folded in the direction where the segment conductor 28 to be connected is provided, and an end 28E of the leg 28B is welded to the end 28E of the other segment conductor 28.

As shown in FIG. 5, the set of the head ends 28C sticking out to the one side of the stator core 132 forms a coil end 61 on one side of the stator coil 60. The set of the ends 28E sticking out to the other side of the stator core 132 forms a coil end 62 on the other side of the stator coil 60. In the following description, the coil end 62 will be referred to as a welding side coil end 62, and the coil end 61, a counter-welding side coil end 61.

On the side of the counter-welding side coil end 61, a lead wire 41U1 connected to an end of the U1-phase coil 60U1 and a lead wire 41U2 connected to an end of the U2-phase coil 60U2 are pulled out. The lead wire 41U1 and the lead wire 41U2 are gathered in a bunch with an alternating terminal 42U. Similarly, on the side of the counter-welding side coil end 61, lead wires 41V1 and 41V2 connected to ends of the V1-phase coil 60V1 and the V2-phase coil 60V2 are gathered in a bunch with an alternating terminal 42V. Lead wires 41W1 and 41W2 connected to ends of the W1-phase coil 60W1 and the W2-phase coil 60W2 are gathered in a bunch with an alternating terminal 42W.

Further, on the side of the counter-welding side coil end 61, neutral point connection conductors 40N1 and 40N2 are provided. The neutral point connection conductor 40N1 relates to the neutral point N1 (see FIG. 6) in one star connection, and the neutral point connection conductor 40N2, to the neutral point N2 in the other star connection.

The stator coil 60 is wound by distributed winding. In the distributed winding, the phase coils are wound around the stator core 132 such that the phase coils are accommodated in two slots 420 with plural slots 420 between the two slots (see FIG. 3). In the present embodiment, as the distributed winding is employed as winding, the formed magnetic flux distribution is nearer to a sine wave in comparison with that formed in concentrated winding, and a reluctance torque is easily caused. Accordingly, in the rotating electrical machine 10, the controllability to utilize weak field control and reluctance torque is improved. It is possible to utilize the rotating electrical machine 10 in a wide rotational speed range from a low rotational speed to a high rotational speed, and to obtain an excellent motor characteristics appropriate to electric vehicles.

Figure 8:
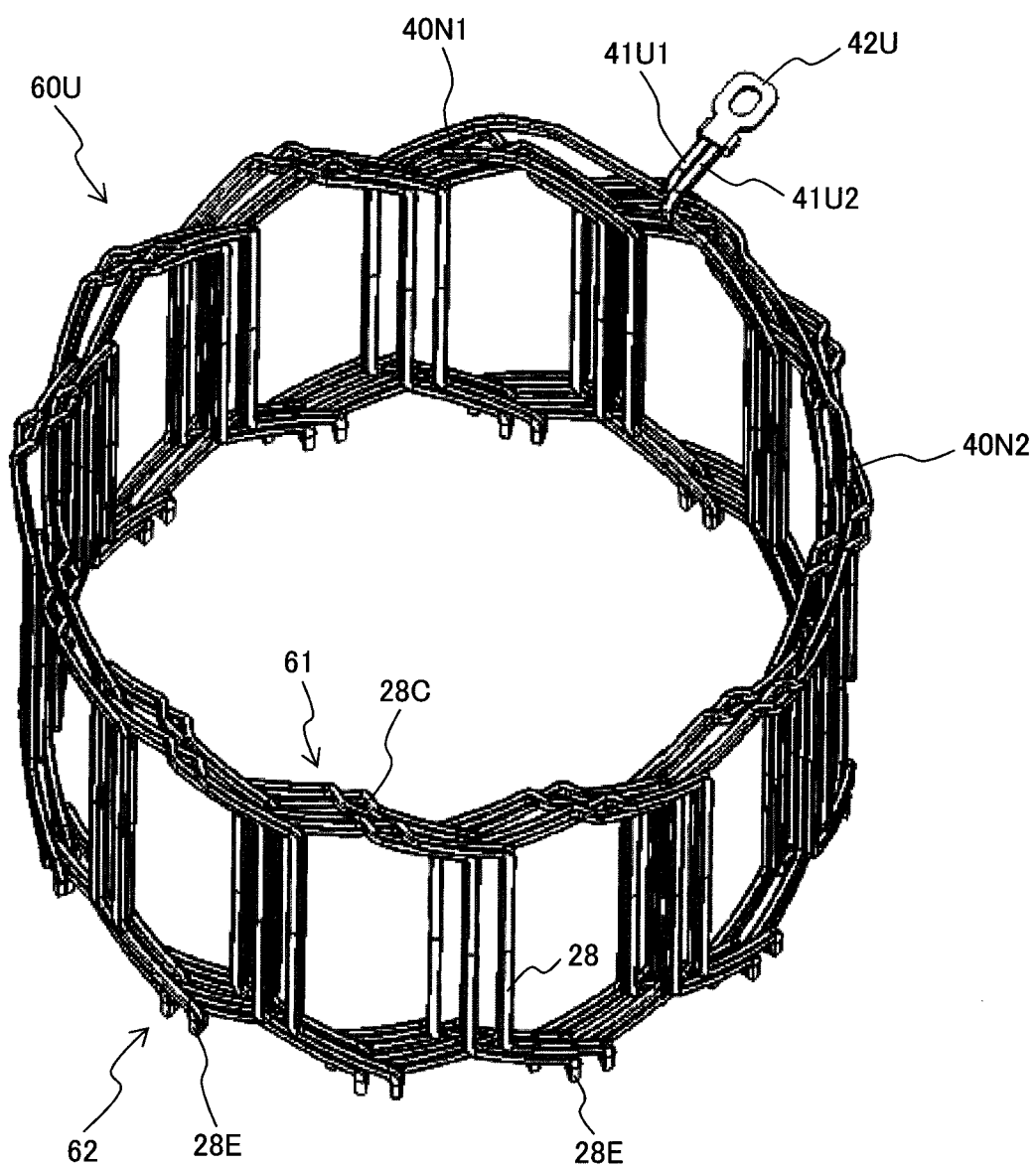
FIG. 8 illustrates a U-phase coil 60U as a phase of the stator coil 60 shown in FIG. 5.
Figure 9:
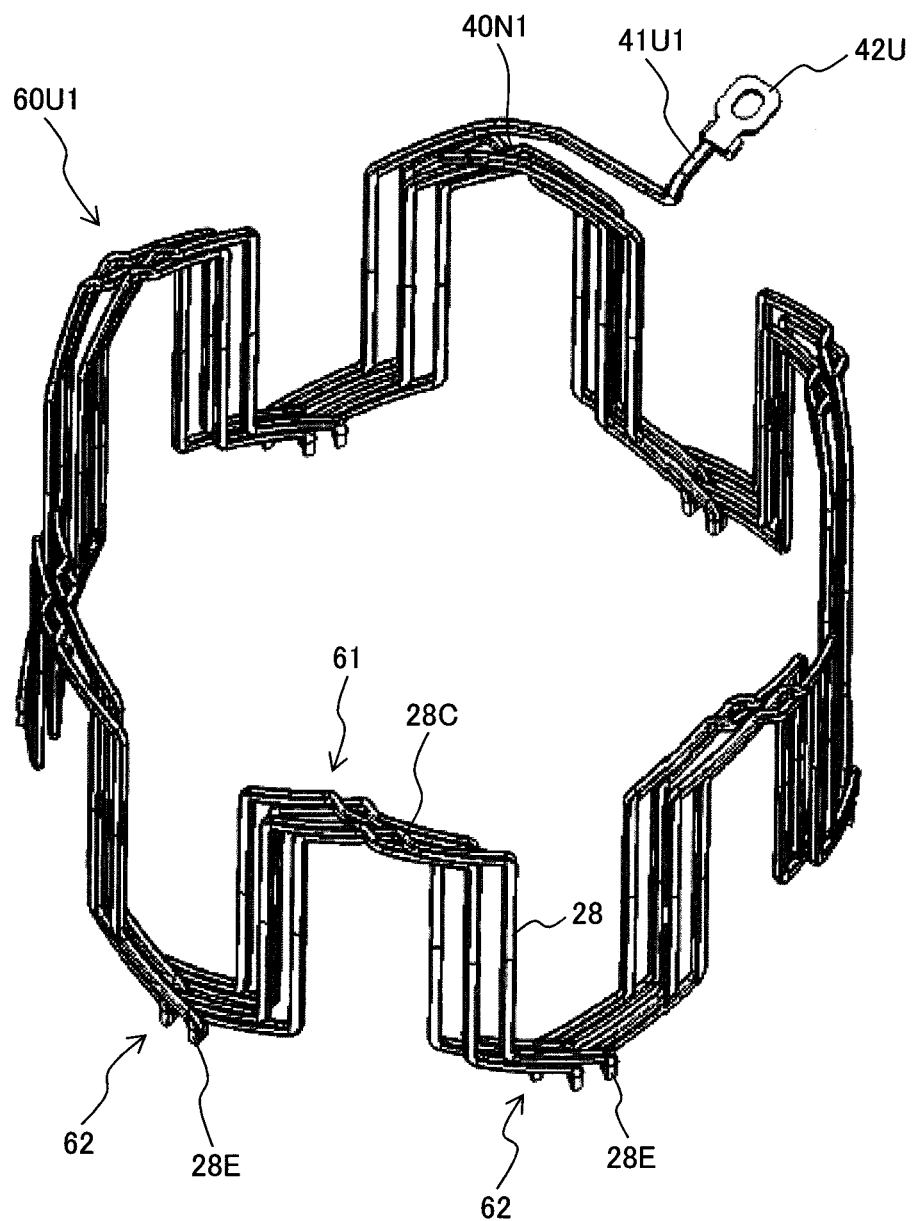
FIG. 9 illustrates a U1-phase coil 60U1.
Figure 10:
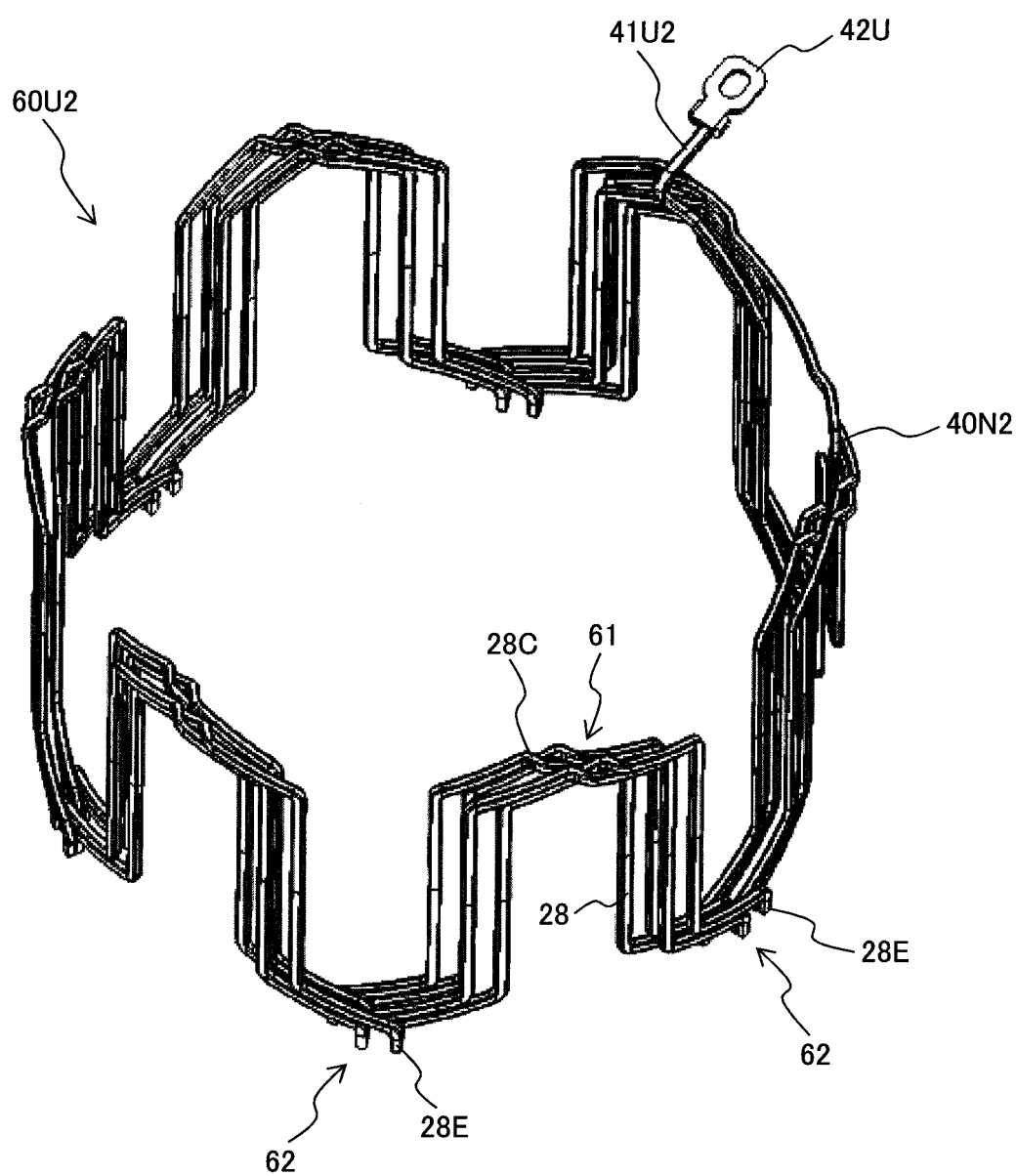
FIG. 10 illustrates a U2-phase coil 60U2.

FIG. 8 illustrates the U-phase coil 60U for one phase of the stator coil 60 shown in FIG. 5. As shown in FIG. 6, the U-phase coil 60U is configured with the U1-phase coil 60U1 for one star connection and the U2-phase coil 60U2 for the other star connection. FIG. 9 illustrates the U1-phase coil 60U1, and FIG. 10 illustrates the U2-phase coil 60U2. As shown in FIG. 9 and FIG. 10, the neutral point connection conductor 40N1 is connected to the other end of the U1-phase coil 60U1. The neutral point connection conductor 40N2 is connected to the other end of the U2-phase coil 60U2.

(Stator Production Technique)

—Bending—

Next, the technique of production of the stator 20 according to the present embodiment will be described. As described above, the segment conductor 28 in the status shown in FIG. 7A is inserted into the slot of the stator core 132. Then, as shown in FIG. 7B, the legs 28B are bent toward the direction of the other segment conductor 28 to be connected.

Figure 11:
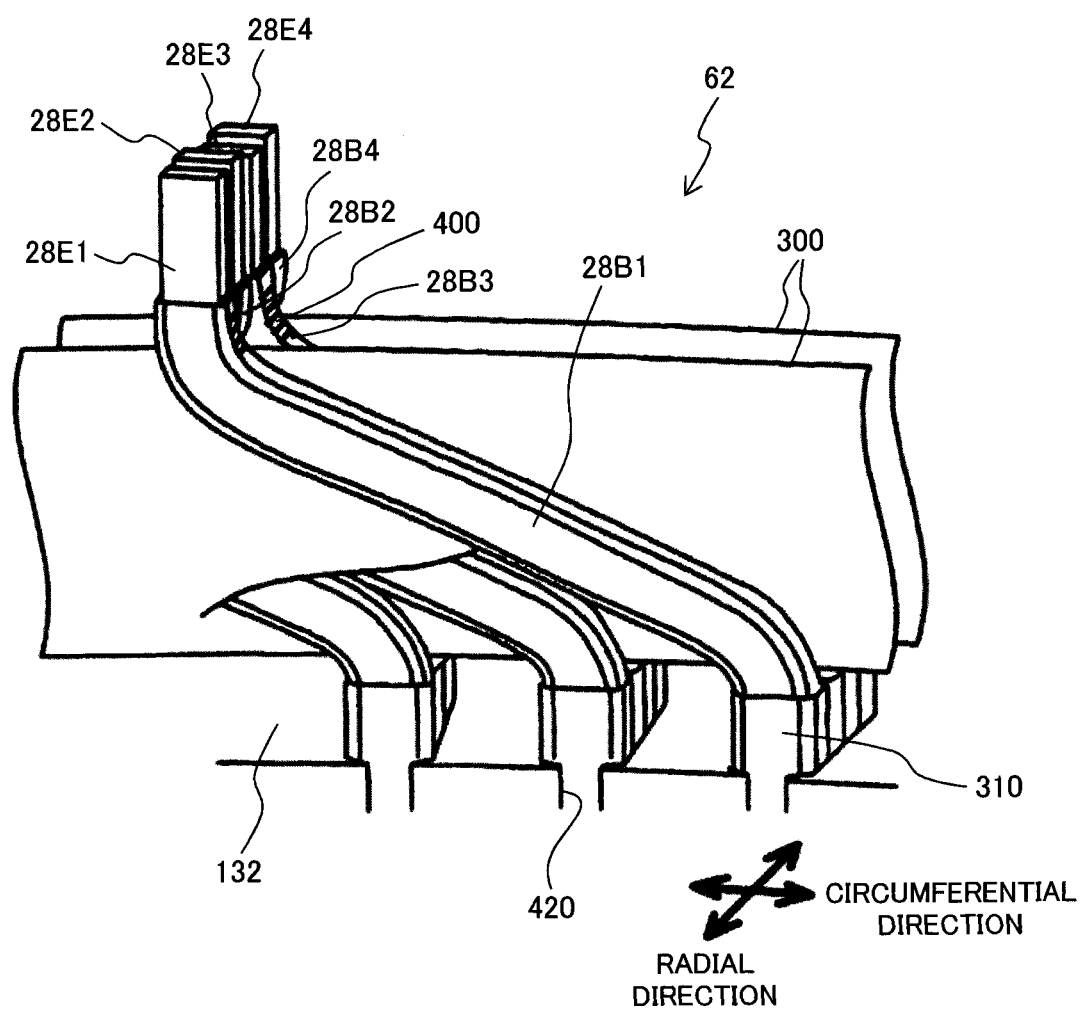
FIG. 11 illustrates arrangement of bending-processed ends 28E1 to 28E4 in a welding side coil end 62.
Figure 12:
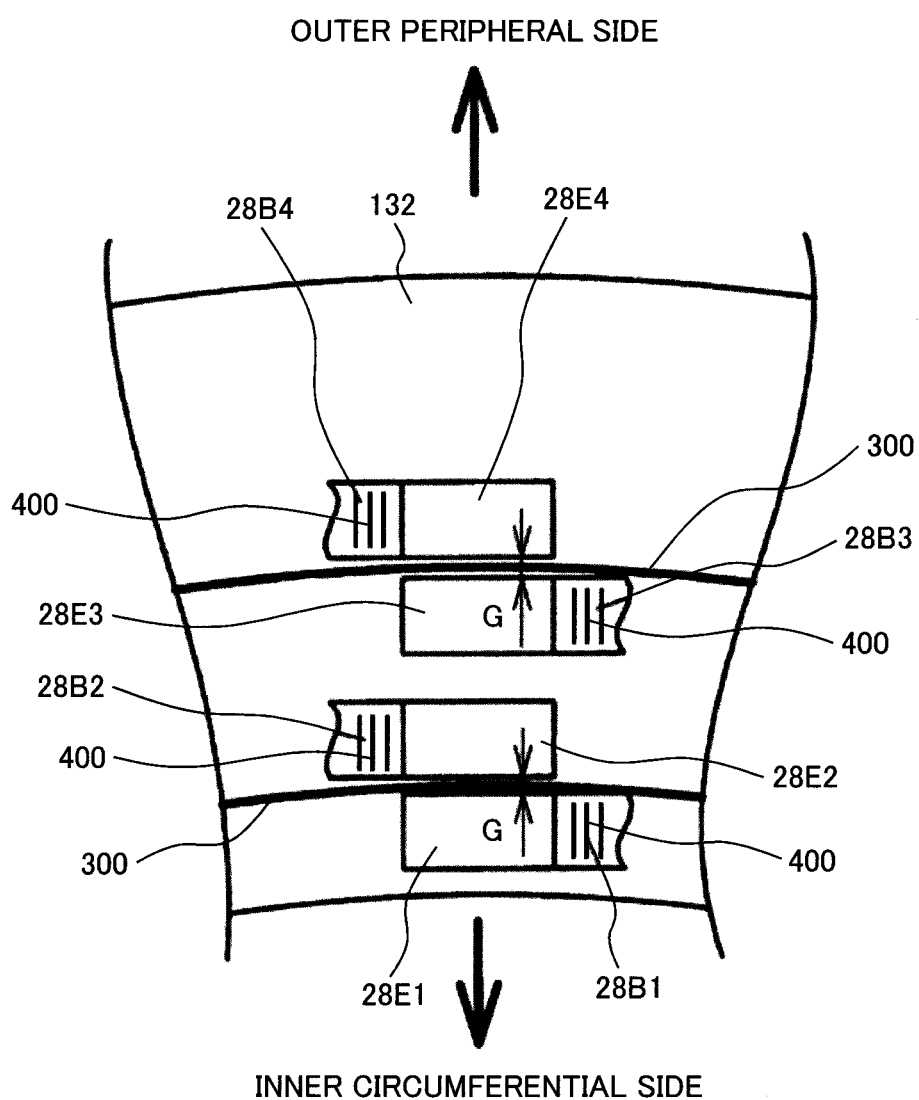
FIG. 12 is a plane view of the welding side coil end 62 viewed from an axial direction.

FIG. 11 illustrates the arrangement of the ends 28E1 to 28E4 in the welding side coil end 62 after the bending. FIG. 11 is a perspective diagram of the welding side coil end 62, and FIG. 12 is a plane view of the welding side coil end 62 viewed from the axial direction.

Four columns of segment conductors 28 are inserted in the slots 420 in the radial direction, and the legs 28B inserted in the slots 420 are provided with a slot liner 310. With the slot liner 310, it is possible to improve the withstand voltage between the segment conductors 28 and between the segment conductor 28 and the inner surface of the slot 420. Note that in the ends 28E1 to 28E4 where connection is performed, the insulating film is removed and the conductor is exposed. The bent part of the insulating film is provided with a bending part 400. The bending part 400 is provided closer to the end to be connected than the bending part of the covering material. In this manner, since a bellows is formed in the enamel coat on the axial direction side, the bending part 400 mitigates burning of the enamel coat after welding. Further, as the part is immersed in varnish after the welding, the insulation is improved. The bending part 400 forms bending before welding. The bending part is formed by molding with an R 0.1 to 0.5 jig, and molding the bending part 400 using enamel coat having small spread with respect to the conductor. Note that the non-bending part means a part of the insulating film having a contact area wider than that with respect to the segment conductor 28 in the bending part 400.

Further, in the welding side coil end 62, insulating paper 300 is provided between the four columns of segment conductors 28 arrayed in the radial direction. The insulating paper 300 is provided, to improve inter-phase insulation and inter-conductor insulation in the welding side coil end 62, between the segment conductor 28, in a ring shape along the circumferential direction. Note that insulating paper 300 also functions as a holding member to prevent dripping of resin material (e.g. polyester or epoxy liquid varnish) when dropped on the entire or part of the stator coil 60.

In this manner, since the insulating paper 300 and the slot liner 310 are provided inside the slot and at the coil end, even when the insulating film of the segment conductor 28 is damaged or degraded, it is possible to maintain necessary withstand voltage. Note that the insulating paper 300 is an insulating sheet of e.g. heat-resistant polyamide paper having a thickness of about 0.1 to 0.5 mm.

The respective legs 28B pulled out from the respective slots 420 are bent in the direction of the segment conductor 28 to be connected while the four column arrangement is maintained. For example, the leg 28B1, inserted in the first column on the inner circumferential side in the slot 420, is bent to the left side in the circumferential direction. Meanwhile, the leg 28B2 having the end 28E2 connected to the end 28E1 of the leg 28B1 is, although not shown, inserted in the second column of the slot 420 on the left side from the end 28E2 in the figure, and is bent to the right side in the circumferential direction from the slot 420. The ends 28E1 and 28E2 are provided to be adjacent to each other in the radial direction. Further, the end 28E3 and the end 28E4, connected to each other, are provided sequentially in the radial direction on the outer peripheral side of the end 28E2.

—End Tip Process—

Figure 13:
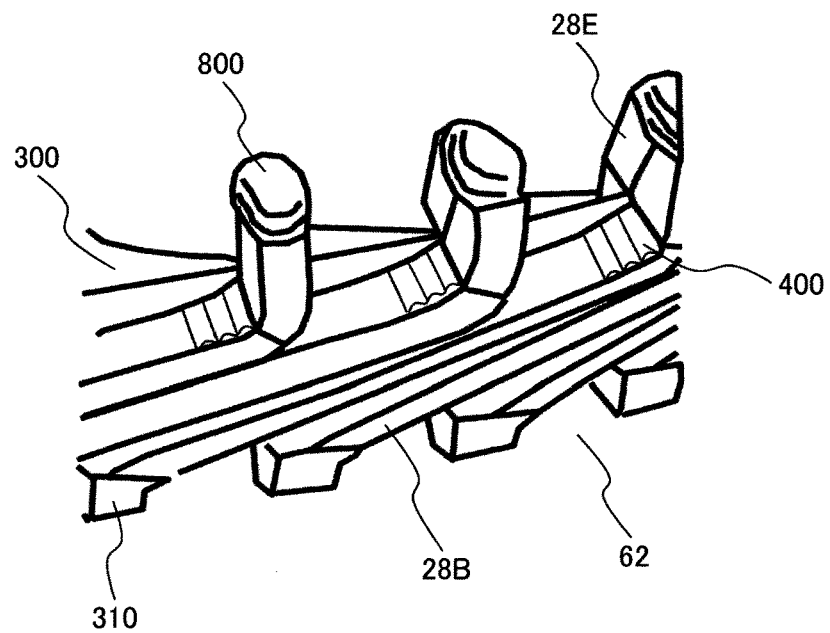
FIG. 13 is a partial perspective diagram of the welding side coil end 62.

Next, to align the heights of the end 28E1 to the end 28E4 and suppress the coil end height, cutting process is performed on the end 28E1 to the end 28E4. FIG. 12 illustrates the end 28E1 to the end 28E4 viewed from the direction of the tip. FIG. 13 is a partial perspective diagram of the welding side coil end 62. The bending part 400 is formed in the enamel coat on the axial-direction side.

Next, as shown in FIG. 13, the end 28E1 and the end 28E2 are connected to each other and the end 28E3 and the end 28E4 are connected to each other, by welding the end tips. A base material is melt and set, and formed as a weld 800, in the end 28E1 and the end 28E2, and in the end 28E3 and the end 28E4. As welding, the base material of the segment conductor 28 is melted by TIG welding of arch welding or plasma welding for connection. As shield gas, argon gas or helium gas, further, gaseous mixture of argon gas and helium gas, or the like, is used. With the bending part 400, it is possible to prevent burning of the enamel coat upon welding. Further, as the enamel coat has a bellows structure, the insulating distance is ensured with respect to the coil. It is possible to improve the insulation. Further, as the immersion of the varnish from the entrance of the bellows structure improves the insulation.

According to the above-described embodiment, the following advantages are obtained.

(1) As described above, in the production technique of the stator 20 for a rotating electrical machine, having the stator core 132 where the plural slots 420 are formed, and the stator coil 60 formed by connecting the plural segment conductors 28 having a rectangular cross section inserted in the slots 420, the tips of the ends 28E1 to 28E4 of a pair of mutually connected segment conductors 28 have a molten metal junction, and the insulating film has a bending part to bend to be in partially contact with the stator coil.

In this manner, by providing the bending part 400 to bend before welding, as shown in FIG. 11, an insulating distance to the coil is ensured by preparing the enamel coat having the bellows structure, and the insulation is improved. Further, as immersion of varnish from the entrance of the bellows structure improves the insulation.

(2) For example, as shown in FIG. 11, the bending part may be formed in the enamel coat on the axial direction side. Otherwise, it is possible to improve the insulation by forming the bending part on the both sides in the axial direction.

The rotating electrical machine 10 as a motive power source on the front wheel side shown in FIG. 14 is provided between the engine ENG and the transmission TR. It has a configuration described with FIG. 1 to FIG. 13. As the rotating electrical machine 10 as a driving force source for the rear wheel side, similar machine may be used, or other rotating electrical machines having a general configuration may be used. Note that it goes without saying that the invention is applicable to hybrid electric vehicles other than the four wheel drive electric vehicles.

As described above, according to the present invention, it is possible to provide a stator for a rotating electrical machine which is a small and high output stator and which has excellent insulation.

In the above description, the embodiment has been explained, however, the present invention is not limited to these contents. Other aspects considered within the scope of the technical idea of the present invention are included in the scope of the present invention.

What is claimed is:

1. A stator for a rotating electrical machine comprising:
a stator core with a plurality of slots;
a winding inserted into the plurality of slots; and
a covering material that covers the winding, wherein
the winding has a molten metal junction,
the covering material has a non-bending part and a bending part,
the bending part of the covering material has a contact area with the winding that is smaller than a contact area between the non-bending part and the winding, and
the bending part is provided between the molten metal junction and the portion of the winding inserted in one slot of the plurality of slots.

2. The stator according to claim 1, wherein the bending part is provided on the axial end face of the covering material.

3. The stator according to claim 1, wherein the bending part is provided in a region that is viewable from an axial direction.

4. A rotating electric machine comprising:
the stator according to claim 1; and
a rotor rotatably arranged over the stator core through a given gap.

* * * * *